Jan. 18, 1966 R. C. DE PAUW 3,229,385
COLOR GUIDE
Filed May 3, 1962
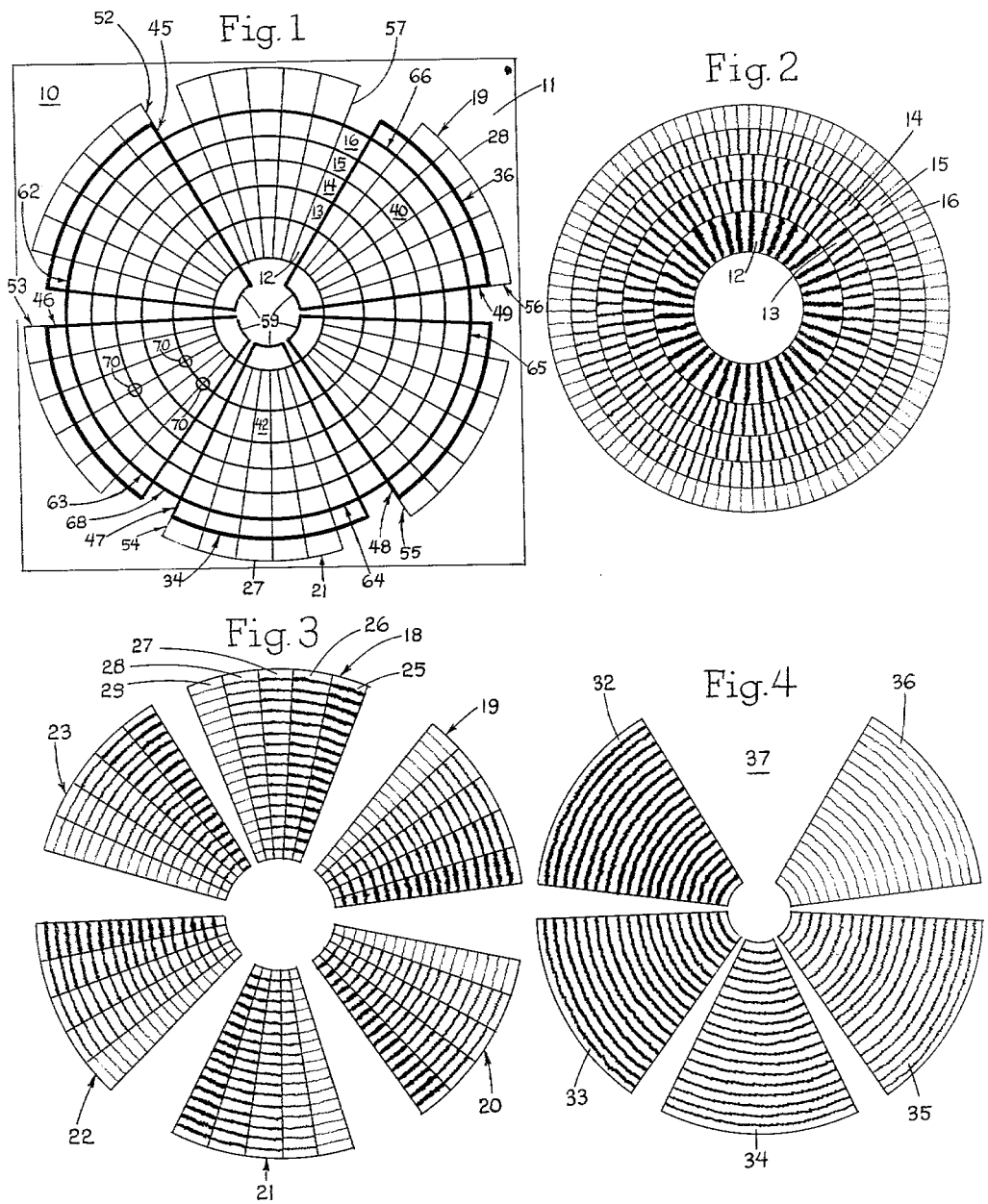
INVENTOR
Robert C. DePauw
BY Hoffman, Brady,
Wegner, Allen & Stellman United States Patent Office 3,229,385
Patented Jan. 18, 1966

3,229,385
COLOR GUIDE
Robert C. De Pauw, Edgewood Hills, Ill.
Filed May 3, 1962, Ser. No. 192,138
6 Claims. (Cl. 35—28.3)

This invention is concerned with a color guide or chart and more particularly with a novel color guide displaying the range of colors available from combinations of hues of graduated saturation.

Various types of color guides are widely used in the graphic arts field, for example as a guide to colors available from three or four primary hues by means of various degrees of screened tints (saturation) and combinations thereof. Present guides, having a full range of hue combinations, are cumbersome and difficult to use in the form of books or large sheets.

A principal object of this invention is the provision of an improved color guide having a full range of hue component saturations and combinations in a complete, compact, simple, accurate and readily useable form. The guide, or chart, may be used in the original selection or matching of colors for a particular purpose, as a visual guide for prediction, specification and control of color in the graphic arts field or to facilitate long distance communication of various colors and color combinations, for example.

One feature of the invention is the provision of a color guide having a generally annular area of hues with at least two hue components, one component graduated radially in one direction of the area and the other graduated circumferentially in another direction of the area.

A further feature is that the first hue component comprises a plurality of annular bands, each band being of a uniform saturation with saturation of the bands being graduated sequentially from band to band. The sectors that extend radially across the bands are of uniform hue saturation along their length and adjacent sectors have progressively graduated hue saturation.

Another feature of the invention is the provision of such a color chart wherein one hue component is graduated radially in one direction of the area and a plurality of hue components are spaced circumferentially about the generally annular area in the form of sectors with the graduated saturations of the radial hue component intersecting graduated saturations of each of the circumferential hue components.

Still another feature is the provision of such a color guide having hues with at least three hue components, one graduated in annular bands, the second in a series of annularly arranged sectors, and the third in repeating sectors corresponding with the sectors of the second component.

Yet a further feature of the invention is that each of the hue components has a portion extending into an area outside the area of the other hue portion, to provide an indication of each pure hue in the various degrees of saturation.

Further features and advantages of the invention will readily be apparent from the following specification and from the drawings, in which:

FIGURE 1 is a diagrammatic representation of a color chart embodying the invention;

FIGURE 2 is a diagrammatic representation of the arrangement of the graduated saturation of one of the hue components;

FIGURE 3 is a diagrammatic representation of the graduated saturation of another hue component; and FIGURE 4 is a diagrammatic representation of the graduated saturation of a third hue component.

Artists and others working with graphic arts reproduction have a continual need for a handy color reference which will provide a wide range of hue component saturation combinations, in a manner which is ready for easy use. At the present time, in the planning and production of color work, it is necessary to determine, specify and control the precise dot sizes of screen tints (saturation) of hues to match or gain desired color at the press.

In some cases it is necessary to determine the screen tint combinations needed to reproduce a given or picked color sample. After screen tint combinations have been selected for a given work, there must be some means of specifying this information in a manner which can be readily followed and positively translated.

In some cases the printer's or engraver's film stripper is given the responsibility of translating a color into screen tint combinations. The film stripper must rely upon his experience and an accurate color guide which shows colors attainable and their printing dot sizes. Also, when following specifications, he must have the same reliable color guide.

In some cases it is necessary for a cameraman to analyze color separation screened positives to determine if the desired color will be gained in critical areas or if camera exposure adjustments must be made. There must be some means by which he can readily compare dot sizes in his screened positives to dot sizes printing the desired color. It would be most helpful if he could easily check his work immediately for assurance before or without color proofing at the press, etc.

Often, correctional dot etching must be done. Skilled experience must work with printed color reference which gives an accurate indication of dot sizes required.

Dot sizes can be changed by different exposures when exposing to the emulsion of plates being made from camera films. Skills must here be coordinated with the skills of the cameraman for accurate control of critical areas of color separation work. A reliable reference must be available to coordinate such efforts verbally or in writing.

In some cases it is necessary for an artist to prepare artwork with artists' grays for fake color separations. There must be some means of guiding his use of gray values to achieve desired colors from two or more hues. Conversely, there must be some means of checking the gray values in his work with gray values which give the saturation values of each hue in an accurate color charting.

Ultimately, in the graphic art field, the pressman must have concern for color control as his work is the aggregate of several careful approximations. All specifications and actions must be made with the same reliable guide available to him to see the reasonable matching of dot sizes, process colors and paper stock—to make such adjustments as he is able to do—and to proceed with assurance.

In some cases management and sales personnel must be aided in client relations by some means of exact and quick color reference. The means of color reference should be well organized and thoroughly simple with precise color designations.

On occasion, it is necessary for two or more people to discuss details of the colors of a particular work at long distance, and as over the telephone or by mail. These situations each require a complete, simple, accurate color chart which is readily used and readily understood.

In some cases of need for color control, for example in an industry such as television, it may be desirable to have a compact pattern of the range of colors available from the intermixed graduated saturations of three hue (or color) components while utilizing a small area to receive the pattern by means of a suitable manner of reproduction and/or transmission. In these cases adequate use of a small area is desired.

In some cases, such as a duocolor guide in the graphic art field, there is a need for a complete and simple manner of presenting the color range or colors available by intermixing the graduated saturations of a dark color (black or color) component with the graduated saturations of two or more other color components while using a small area. In these cases adequate use of a small area is desired.

The color chart which is the subject of this invention, is well suited for all these purposes. Many other uses, as a teaching aid, for example, will be apparent.

Referring now to drawings, FIGURE 1 shows a composite color chart 10 imprinted on a sheet 11. The nature of the color chart will be readily apparent from a consideration of FIGURES 2 through 4 which illustrate diagrammatically the arrangement of each of the hue components.

A first hue component, as magenta, is illustrated in FIGURE 2. The magenta is arranged in a series of five annular bands 12, 13, 14, 15 and 16. The magenta hue within each band is of the uniform saturation, and the saturation varies from band to band. The inner band 12, for example, may have 100 percent saturation, band 13 a 70 percent saturation, band 14 a 50 percent saturation, band 15 a 30 percent saturation and band 16 a 10 percent saturation. The different degrees of saturation are indicated in the drawings by the weight of the radially extending lines within each band. Adjacent bands are contiguous so that hues may be compared without the distraction of an intervening space. Of course, if desired, the number of bands could be increased or decreased and the particular saturation for each band selected with regard to the end use of the particular color chart.

The arrangement of the second hue, as cyan, is illustrated in FIGURE 3. Here six sectors are provided, and arranged uniformly so that they may be substantially superposed with the annular bands of FIGURE 2. Each of the spaced sectors is divided into five sector portions, with the saturation of the hue of each sector portion being uniform, in a radial direction. The adjacent sector portions in each sector, however, have a graduated saturation. For example, in sector 18, sector portion 25 may have a 100 percent cyan saturation, sector portion 26 a 70 percent saturation, sector portion 27 a 50 percent saturation, sector portion 28 a 30 percent saturation, and sector portion 29 a 10 percent saturation. The sector portion arrangement of sector 18 is repeated in each of the sectors 19, 20, 21, 22 and 23.

FIGURE 4 illustrates the configuration of a third hue component, as yellow. Here, five sectors 32, 33, 34, 35 and 36 are provided, each being generally the same size as one of the sectors of FIGURE 3. As there are only five sectors in FIGURE 4, there is a blank area 37 corresponding with sector 18 of FIGURE 3. Each of the sectors 32 through 36 has a different saturation of its hue. For example, sector 32 may be 100 percent saturated, while sector 33 is 70 percent saturated, sector 34, 50 percent saturated, sector 35, 30 percent saturated and sector 36, 10 percent saturated.

The three hue components, i.e., the magenta bands of FIGURE 2, the cyan repeating sectors of FIGURE 3 and the yellow sectors of FIGURE 4, for example, are combined in the color chart 10 to provide discrete areas with all possible combinations of the various saturations of the three hues, and to provide subcombinations and pure colors of the various saturation levels. Consider for example the upper right hand quadrant of the color chart. The cyan sector 19 and the yellow sector 36 are combined with annular bands 12, 13, 14, 15 and 16. Each of the discrete areas indicated by the radial and annular lines has a unique combination of hue concentrations. For example, area 40 lies in band 15, and has a 30 percent magenta concentration. This area also lies in sector portion 28 of sector 19 has a 30 percent cyan concentration. The area likewise falls in sector 36 of the yellow, a 10 percent concentration.

As a further example, consider the area 42 at the lower portion of the chart. This area lies in annular band 13, 70 percent magenta, in sector portion 27 of cyan sector 21, a 50 percent concentration, and in sector 34 of the yellow, a 50 percent concentration.

In addition to the combinations of the three hues, the chart also provides complete combinations of the hues two at a time. At the top of the chart, sector 18 of the cyan is combined with the annular bands of magenta, but without any yellow, as will appear by reference to FIGURE 4. Furthermore, it will be noted that each of the cyan and yellow sectors extend outwardly beyond the outer band of the magenta. Accordingly, the areas at 45, 46, 47, 48 and 49 provide the full range of two-tone combinations, of cyan and yellow. The cyan sectors also extend beyond the periphery of the yellow sectors so that areas of pure cyan are provided at 52, 53, 54, 55, 56 and 57. The yellow sectors 32 through 36 extend inwardly toward the center of the chart area beyond the inner portion of the magenta bands and the cyan sectors, providing areas 59 of the various concentrations of pure yellow. Furthermore, the angular extent of the yellow sectors 32 through 36 is greater than the angular extent of the cyan sectors 18 through 23. Thus, combinations of yellow and magenta are provided at 62, 63, 64, 65 and 66. Furthermore, the small generally rectangular area of each of the yellow sectors lying outside the outer cyan band and outside the magenta sectors, provides a pure yellow in each of the hue concentrations. Radial sectors as 68 between the yellow sectors 32 through 36 provide areas of pure magenta.

Thus, the novel arrangement of hues illustrated in FIGURE 1 provides discrete areas of uniform hue saturation combinations and subcombinations of various saturation concentrations with the variations of hues remaining adjacent and in a compact reference area.

The color chart 10 may be used in various ways. For example, it may be printed by a suitable three-color process on an opaque sheet 11. For some purposes, it may be desirable to print the chart on a transparent sheet so that it may be superimposed over stock paper or a design for matching or comparison purposes. Where the opaque sheet is used, a series of perforations 70 may be provided in the chart, to permit viewing and matching of underlying color. The three perforations illustrated in FIGURE 1 are merely exemplary, and they may be provided throughout the extent of the chart, at spaced points sufficient to provide for comparison with each of the hue combinations. As indicated in FIGURE 1, the perforations are preferably located at points where four discrete hue areas meet. Thus one perforation permits comparison with four different hue combinations.

A guide on transparent stock may be constructed by displaying each of the hue components, i.e., the hue configurations of FIGURES 2, 3 and 4, on a separate sheet of transparent material. The sheets, when superimposed with the hue areas registered as shown in FIGURE 1, provide a guide with a complete range of hue combinations, sub-combinations and pure hue areas.

Gray tints of differing black concentration may be provided. This may be a separate sheet of clear material having graduated gray tints and which is placed to overlay the chart in any desired position to view and evaluate addition of a gray component. Addition of gray components may also be accomplished by printing graduated gray tints individually to succeeding pages containing color combinations of the three hue components.

A two-color or duocolor guide incorporating the novel concepts of the invention provides a wide variety of hue combinations in a small, readily useable form. Such a guide is based on the hue component arrangements of FIGURES 2 and 3. One hue component is arranged in the series of discrete annular bands as shown in FIGURE 2. Several different color components form the sector arrangement of FIGURE 3. Thus, one color might be used for sector 18 and a different color for sector 19, with the sector portions of each sector having a different degree of saturation and being uniform throughout the sector portion. For example, each of the sectors 18–23 might have a different quality of the same basic color, or they might be entirely different colors. This arrangement, in combination with the annular bands of FIGURE 2, provides a wide variety of two-color hue combinations.

The color guide should include a gray scale reference keyed to the gradated saturation values of the hues. This is particularly important to artists and others concerned with gray value translations of hue saturation values.

The color guide should include an enlarged dot size reference keyed to the different saturation and gray tint gradations used. This is particularly important in providing quick dot size reference for graphic arts personnel.

In addition to its use directly in the field of graphic arts, the color guide disclosed herein is well suited for use as a color reference in other fields, as with color television. For example, each color television receiver might be accompanied by a small simplified color guide of the type illustrated in FIGURE 1 and utilizing the three basic hue components of color television. An identical test pattern broadcast by the transmitting stations would enable the set owner to adjust properly the chroma controls of the receiver.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. A color guide of the character described, comprising an annular area of hues having at least three hue components, the first hue component having a series of discrete annular bands of graduated saturation radially of said area and of uniform saturation within each band, the second hue component comprising a series of sectors of graduated saturation circumferentially of said area and of uniform saturation within each sector, and the third hue component comprising a series of repeating sectors, each with sector portions of graduated saturation circumferentially of said area, and of uniform saturation within each sector portion, said repeating sectors corresponding with said second hue sectors.

2. The color guide of claim 1 wherein the first and second hue components have coextensive portions outside the area of the third hue component, the first and third hue components have coextensive portions outside the area of the second hue component and the second and third hue components have coextensive portions outside the area of the first hue component each of the coextensive portions having a full range of hue saturations for each component to provide a full range of subcombinations of the hue components.

3. The color guide of claim 1 wherein each of the hue components has a portion with a full range of hue saturations outside the area of the other two hue components, to provide areas of pure hue component.

4. The color guide of claim 1 wherein said annular area is displayed on opaque stock.

5. The color guide of claim 1 wherein said area is displayed on transparent stock.

6. The color guide of claim 1 wherein each of said hue components is displayed on a separate sheet of transparent stock, the sheets being arranged in superposed relation.

References Cited by the Examiner

UNITED STATES PATENTS

| | | | |
|---|---|---|---|
| 862,336 | 8/1907 | Kallab | 35—28.3 |
| 901,655 | 10/1908 | Simpkin | 35—28.3 |
| 1,597,830 | 8/1926 | Rueger | 35—28.3 X |
| 1,598,899 | 9/1926 | Vogel | 35—28.5 |
| 1,709,975 | 4/1929 | Foshay | 35—28.3 |
| 2,286,780 | 6/1942 | Yule | 35—28.5 X |

EUGENE R. CAPOZIO, *Primary Examiner.*

LEO SMILLOW, JEROME SCHNALL, *Examiners.*